United States Patent
Liu et al.

(10) Patent No.: US 10,499,399 B2
(45) Date of Patent: *Dec. 3, 2019

(54) METHOD AND DEVICE FOR PERFORMING BEAMFORMING

(71) Applicant: Telefonaktiebolaget LM Ericsson (publ), Stockholm (SE)

(72) Inventors: Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,332

(22) Filed: Feb. 7, 2018

(65) Prior Publication Data

US 2018/0167925 A1 Jun. 14, 2018

Related U.S. Application Data

(63) Continuation of application No. 14/889,140, filed as application No. PCT/CN2015/092255 on Oct. 20, 2015, now Pat. No. 9,913,277.

(51) Int. Cl.
*H04W 72/04* (2009.01)
*H04W 16/28* (2009.01)
*H04W 76/28* (2018.01)
*H04B 7/06* (2006.01)
(Continued)

(52) U.S. Cl.
CPC ........ *H04W 72/046* (2013.01); *H04B 7/0695* (2013.01); *H04W 16/28* (2013.01); *H04W 24/10* (2013.01); *H04W 72/085* (2013.01); *H04W 76/28* (2018.02)

(58) Field of Classification Search
None
See application file for complete search history.

(56) References Cited

U.S. PATENT DOCUMENTS

| 9,204,395 B2 | 12/2015 | Li et al. |
| 9,913,277 B2 * | 3/2018 | Liu ............ H04B 7/0617 370/328 |
| 2007/0109179 A1 | 5/2007 | Werntz et al. |

(Continued)

FOREIGN PATENT DOCUMENTS

| WO | 2005076841 A2 | 8/2005 |
| WO | 2014112757 A1 | 7/2014 |

OTHER PUBLICATIONS

International Preliminary Report on Patentability for Application No. PCT/CN2015/092255, dated May 3, 2018, 7 pages.
(Continued)

*Primary Examiner* — Anh Vu H Ly
(74) *Attorney, Agent, or Firm* — NDWE LLP (57) ABSTRACT

A scheme to perform beamforming in a wireless communication network. A method implemented by a first device in the wireless communication network provides for determining a target beam based on a plurality of predefined beams for data transmission to a second device performing discontinuous reception. The data is then transmitted over the target beam to the second device in an active duration of the second device. In this way, beam mismatching may be mitigated and transmission quality in the wireless communication network may be improved.

14 Claims, 6 Drawing Sheets

(51) Int. Cl.
*H04W 24/10* (2009.01)
*H04W 72/08* (2009.01)

(56) References Cited

U.S. PATENT DOCUMENTS

| | | |
|---|---|---|
| 2009/0122736 A1 | 5/2009 | Damnjanovic et al. |
| 2010/0165914 A1 | 7/2010 | Cho et al. |
| 2011/0002223 A1 | 1/2011 | Gross et al. |
| 2011/0065448 A1 | 3/2011 | Song et al. |
| 2013/0331081 A1* | 12/2013 | Rune .................. H04B 7/0408 455/418 |
| 2014/0128109 A1* | 5/2014 | Li ........................ H04W 68/02 455/458 |
| 2014/0198696 A1* | 7/2014 | Li ...................... H04W 52/0229 370/311 |
| 2015/0063182 A1 | 3/2015 | Wang |
| 2015/0078189 A1 | 3/2015 | Kwon et al. |
| 2015/0264583 A1 | 9/2015 | Sundström et al. |
| 2015/0351135 A1 | 12/2015 | Schmidt et al. |
| 2016/0066197 A1 | 3/2016 | Park et al. |
| 2016/0095003 A1* | 3/2016 | Yu ........................ H04W 16/28 370/311 |
| 2016/0192433 A1 | 6/2016 | Deenoo et al. |
| 2016/0337916 A1 | 11/2016 | Deenoo et al. |
| 2017/0026938 A1 | 1/2017 | Onggosanusi et al. |

OTHER PUBLICATIONS

International Search Report and Written Opinion for Application No. PCT/CN2015/092255, dated Jul. 1, 2016, 12 pages.
Non-Final Office Action from U.S. Appl. No. 14/889,140, dated Aug. 15, 2017, 11 pages.
Notice of Allowance from U.S. Appl. No. 14/889,140, dated Oct. 25, 2017, 5 pages.
Partial Supplementary European Search Report for Application No. EP15906436.9, dated Apr. 26, 2019, 17 pages.
Extended European Search Report for Application No. EP15906436.9, dated Jul. 30, 2019, 14 pages.

* cited by examiner

METHOD AND DEVICE FOR PERFORMING BEAMFORMING

CROSS-REFERENCE TO RELATED APPLICATIONS

This application is a continuation of U.S. application Ser. No. 14/889,140, filed Nov. 4, 2015, which is a National stage of International Application No. PCT/CN2015/092255, filed Oct. 20, 2015, which are all hereby incorporated by reference.

TECHNICAL FIELD

Embodiments of the present disclosure generally relate to the field of communications, and more particularly, to a method and device for performing beamforming.

BACKGROUND

Beamforming is a signal processing technique that can be used to improve reception quality and increase data throughput in a wireless communication network. In a wireless communication network employing beamforming, relative gain and phase of an array of antennas elements can be adjusted so that an antenna beam can be directed for receiving or transmitting data. Beamforming using directional antennas concentrates electromagnetic energy to produce a radiation pattern in one or more desired directions.

Due to lack of available low frequency bands, future radio systems are expected to be operated at high frequency bands. The disadvantage is that the propagation attenuation of high frequency is much larger than the low frequency. By way of example, the attenuation may be approximately proportional to the square of the carrier frequency in the same propagation environment. In order to ensure coverage, High Gain Beam Forming (HGBF) is being paid more and more attention. As beamforming gain is roughly proportional to the number of integrated antenna elements, significant beamforming gain can be expected with large number of antenna elements. With high gain beamforming, the spatial beam would be rather narrower compared to conventional systems.

Discontinuous Reception (DRX) is an important method for both power saving and signaling overhead reduction. In the DRX state, the terminal device wakes up for data reception in an active duration (also referred to as "wake period") and goes to sleep for an inactive duration (also referred to as "sleep period") in turn, and thus can keep radio connection at low power consumption. For the network, it saves the signaling overhead due to frequently paging and radio connection establishment and release for small data transmissions.

However, in the high gain beamforming, coverage of a beam is relatively small due to the narrow beam width. If the terminal device receives data over a beam in an active duration and moves fast in the following inactive duration, it is possible that the terminal device goes beyond the coverage of the beam and cannot receive data any more when it enters the next active duration. Thus, an undesirable beam mismatching issue which deteriorates transmission quality would occur and needs to be mitigated.

SUMMARY

In general, embodiments of the present disclosure provide a solution for performing beamforming in a wireless communication network.

In a first aspect, a method implemented by a first device in a wireless communication network is provided. The first device determines a target beam based on a plurality of predefined beams for data transmission to a second device performing discontinuous reception. Then, the first device transmits data over the target beam to the second device in an active duration of the second device to improve transmission quality. The corresponding computer program is also provided.

In one embodiment, the step of determining a target beam may comprise: determining a beam set including at least one candidate beam based on the plurality of predefined beams, the at least one candidate beam including at least one of a beam used in historical data transmission, a beam adjacent to the beam used in historical data transmission, and a beam indicated in a report from the second device; and determining the target beam from the at least one candidate beam in the beam set.

In one embodiment, the step of determining a beam set may comprise: determining a size of the beam set based on at least one of beam width of each of the plurality of predefined beams and a moving speed of the second device; and selecting the at least one candidate beam from the plurality of predefined beams according to the determined size of the beam set.

In one embodiment, the step of determining a beam set may comprise: determining a life period of each candidate beam in the beam set, the life period indicating a time period for which a candidate beam is in the beam set; and in response to determining that the life period of a candidate beam exceeds a predetermined life threshold, removing the candidate beam from the beam set.

In one embodiment, the step of determining a target beam may comprise: calculating an average direction of the at least one candidate beam in the beam set; determining one of the at least one candidate beam having a direction closest to the average direction as a central beam; and determining the target beam based on the central beam.

In one embodiment, the step of determining a target beam may comprise: determining, as the target beam, one of the plurality of predefined beams or a combination of a group of the plurality of predefined beams.

In one embodiment, the step of determining a target beam may further comprise: determining a repetition number for the target beam based on historical transmission quality. The step of transmitting data over the target beam may comprise: transmitting data over the target beam for the repetition number of times to the second device.

In one embodiment, the step of determining a repetition number may comprise: obtaining the historical transmission quality based on a report from the second device; obtaining reference transmission quality corresponding to a reference beam width; and determining the repetition number based on the historical transmission quality and the reference transmission quality.

In one embodiment, the step of determining a target beam may comprise: determining a beam width of the target beam based on historical transmission quality; and determining the target beam having the determined beam width based on the plurality of predefined beams.

In one embodiment, the step of determining a beam width may comprise: obtaining the historical transmission quality based on a report from the second device; obtaining reference transmission quality indicating transmission quality corresponding to an acceptable beam width; and determining the beam width based on the historical transmission quality and the reference transmission quality.

In one embodiment, if the second device fails to decode the data, the first device may transmit a broadcasting message for initiating connection re-establishment to initiate re-establishment of a radio connection between the first device and the second device.

In a second aspect, a method implemented by a second device in a wireless communication network is provided. The second device receives data transmitted from a first device over a target beam in an active duration of the second device. The target beam is determined based on a plurality of predefined beams to improve transmission quality.

In one embodiment, the target beam may be determined from a beam set including at least one candidate beam, the at least one candidate beam including at least one of a beam used in historical data transmission, a beam adjacent to the beam used in historical data transmission, and a beam indicated in a report from the second device.

In one embodiment, the target beam may be determined by determining a size of the beam set based on at least one of beam width of each of the plurality of predefined beams and a moving speed of the second device, and selecting the at least one candidate beam from the plurality of predefined beams according to the determined size of the beam set.

In one embodiment, the target beam may be determined by determining a life period of each candidate beam in the beam set, the life period indicating a time period for which a candidate beam is in the beam set, and in response to determining that the life period of a candidate beam exceeds a predetermined life threshold, removing the candidate beam from the beam set.

In one embodiment, the target beam may be determined by calculating an average direction of the at least one candidate beam in the beam set, determining one of the at least one candidate beam having a direction closest to the average direction as a central beam, and determining the target beam based on the central beam.

In one embodiment, the second device may receive the data by obtaining a repetition number for the target beam, the data being transmitted from the first device for the repetition number of times; and receiving the data for the repetition number of times.

In one embodiment, the second device may further measure signal strength based on the received data; determine transmission quality of the target beam based on the measured signal strength; and if the transmission quality exceeds a predetermined quality threshold, transmit a report indicating at least one of the determined transmission quality and the measured signal strength to the first device.

In one embodiment, the second device may further measure signal strength based on the received data; determine current transmission quality of the target beam based on the measured signal strength; and if a difference between the current transmission quality and a historical transmission quality exceeds a predetermined difference threshold, transmit a report indicating the current transmission quality to the first device.

In one embodiment, the second device may, in response to receiving a broadcasting message for initiating connection re-establishment from the first device, perform re-establishment of a radio connection between the first device and the second device.

In a third aspect, a first device in a wireless communication network is provided. The first device comprises a controller and a transceiver. The controller is configured to determine a target beam based on a plurality of predefined beams for data transmission to a second device performing discontinuous reception. The transceiver is configured to transmit data over the target beam to the second device in an active duration of the second device to improve transmission quality.

In a fourth aspect, a second device in a wireless communication network is provided. The second device comprises a transceiver. The transceiver is configured to receive data transmitted from a first device over a target beam in an active duration of the second device, the target beam being determined based on a plurality of predefined beams to improve transmission quality.

In a fifth aspect, a first device in a wireless communication network is provided. The first device comprises: a processor and a memory, the memory containing instructions executable by the processor, whereby the processor being adapted to cause the first device to: determine a target beam based on a plurality of predefined beams for data transmission to a second device performing discontinuous reception; and transmit data over the target beam to the second device in an active duration of the second device to improve transmission quality.

In a sixth aspect, a second device in a wireless communication network is provided. The second device comprises: a processor and a memory, the memory containing instructions executable by the processor, whereby the processor being adapted to cause the second device to: receive data transmitted from a first device over a target beam in an active duration of the second device, the target beam being determined based on a plurality of predefined beams to improve transmission quality.

According to embodiments of the present disclosure, a target beam is determined based on a plurality of predefined beams for use in data transmission to a terminal device in the DRX state. In this way, coverage can be guaranteed and the beam mismatch as discussed above can be avoided. As a result, transmission quality in the wireless communication network can be improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "first device" refers to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

In the disclosure, the term "second device" refers to a terminal device, which may be a Mobile Terminal (MT), a Subscriber Station (SS), a Portable Subscriber Station, a Mobile Station (MS), or an Access Terminal (AT). The MT may include, but not limited to, a mobile phone, a cellular phone, a smart phone, a personal digital assistant (PDA), and the like.

As used herein, the terms "first" and "second" may refer to a same element or different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
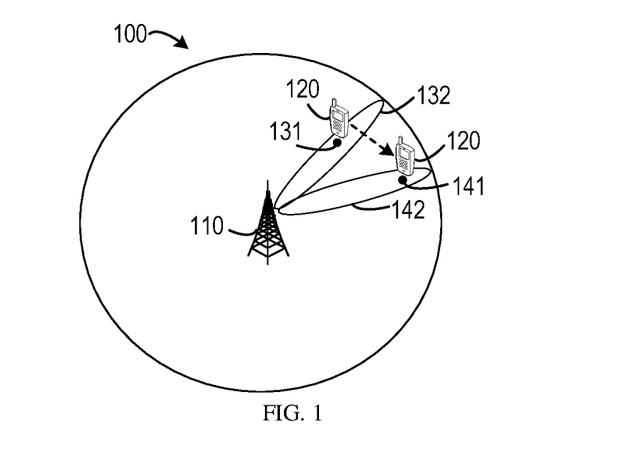
FIG. 1 shows an environment of a wireless communication network in which embodiments of the present disclosure may be implemented.

Now some exemplary embodiments of the present invention will be described below with reference to the figures. Reference is first made to FIG. 1, which illustrates an environment of a wireless communication network 100 in which embodiments of the present disclosure may be implemented. As shown in FIG. 1, the wireless communication network 100 includes a first device 110, which is exemplarily implemented as a BS 110, and a second device 120, which is exemplarily implemented as a terminal device 120.

The wireless communication network 100 may follow any suitable communication standards, such as LTE-Advanced (LTE-A), LTE, Wideband Code Division Multiple Access (WCDMA), High-Speed Packet Access (HSPA), and so on. Furthermore, the communications between the terminal devices 120a and 120b and the BSs 110a and 110b in the network 100 may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Figure 2:
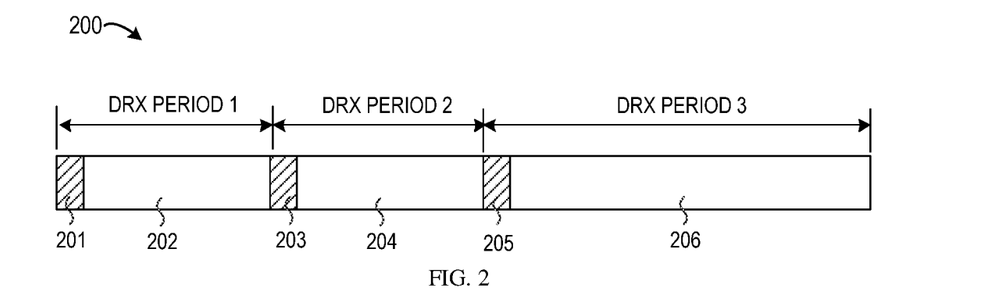
FIG. 2 shows an example diagram of DRX periods in accordance with one embodiment of the present disclosure.

The BS 110 transmits data to the terminal device 120 by performing beamforming via an antenna array. The terminal device 120 performs Discontinuous Reception (DRX) and receives the data transmitted from the BS 110 in a discontinuous way. FIG. 2 shows an example diagram 200 of DRX periods in accordance with one embodiment of the present disclosure. In the example of FIG. 2, three DRX periods 1, 2, and 3 are exemplarily shown. Each of them includes an active duration (as indicated by 201, 203 and 205) and an inactive duration (as indicated by 202, 204 and 206). At the DRX period 1, the terminal device 120 receives data from the BS 110 in the active durations 201 and does not receive any data in the inactive duration 202. The terminal device 120 then operates at the DRX periods 2 and 3 in a similar way. The DRX period may be adjusted if no data is received for a time period exceeding a predetermined threshold. In the example of FIG. 2, since the terminal device 120 does not receive any data in the active durations 201 and 203, that is, no data is received during the DRX periods 1 and 2, the inactive duration 206 of the DRX period 3 may be adjusted to be double of the inactive duration 202 or 204, so as to improve power saving of the terminal device 120.

Conventionally, when the BS 110 transmits data to the terminal device 120, it performs beamforming to better exploit spatial selectivity of corresponding wireless channels, so as to increase gain in a direction the data is to be sent. The direction is associated with the position of the terminal device 120 during transmission from the BS 110 to the terminal device 120. In the example of FIG. 1, it is supposed that the terminal device 120 that is located at a position 131 receives data transmitted from the BS 110 over a first beam (as indicated by its coverage 132) in the active duration 201. If the terminal device 120 moves to a different position 141 during the inactive duration 202 while the BS 110 transmits data to the terminal device 120 over the first beam in the next active duration 203, the beam mismatching issue may occur and the terminal device 120 cannot receive the data transmitted over the first beam successfully.

In accordance with embodiments of the present disclosure, the beam mismatching issue can be mitigated. In some embodiments, in the active duration 203, the BS 110 determines one or more target beams, for example a second beam (as indicated by its coverage 142), based on a plurality of predefined beams, instead of directly employing the first beam, to transmit data to the terminal device 120. In this way, it is possible to increase the possibility that the terminal device 120 is located in the coverage of the beam over which data is transmitted in the active duration 203. As a result, the beam mismatching issue can be mitigated, and the transmission quality in the wireless communication system 100 can be improved.

It is to be understood that the configuration of FIG. 1 is described merely for the purpose of illustration, without suggesting any limitation as to the scope of the present disclosure. Those skilled in the art will appreciate that the wireless communication network 100 may include any suitable number of terminal devices and BSs and may have other suitable configurations.

Figure 3:
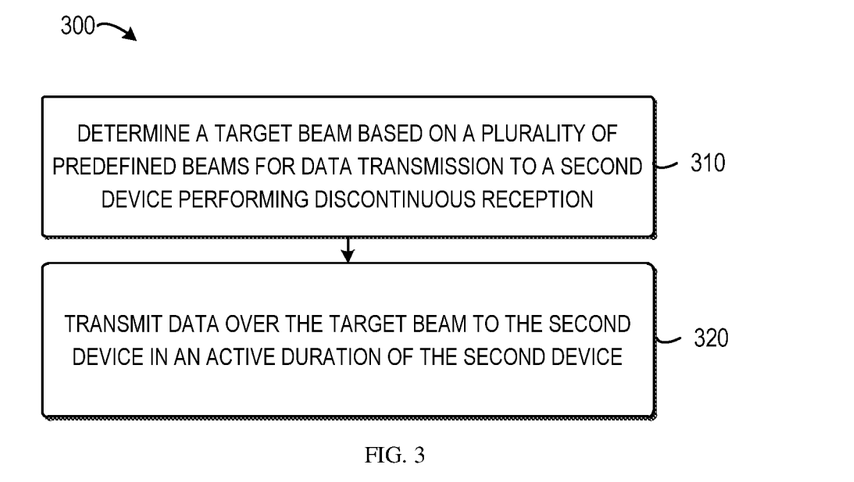
FIG. 3 shows a flowchart of a method implemented by a first device in accordance with an embodiment of the present disclosure.

Now reference is made to FIG. 3, which shows a flowchart of a method 300 implemented by a first device in accordance with one embodiment of the present disclosure. With the method 300, the above and other potential deficiencies in the conventional approaches can be overcome. It would be appreciated that the method 300 may be implemented by a first device, such as the BS 110 or other suitable devices. For the purpose of illustration, the method 300 will be described below with reference to the BS 110 in the wireless communication system 100.

The method 300 is entered in step 310, where a target beam is determined based on a plurality of predefined beams for data transmission to a second device performing discontinuous reception.

In embodiments of the present disclosure, a beam may be characterized by a beam width, a beam direction, coverage and other suitable factors. In embodiments of the present disclosure, it is supposed that a plurality of beams are predefined in advance and may be referred to as "predefined beams." A predefined beam may be obtained in several ways. By way of example, a predefined beam may be obtained based on a predefined beamforming matrix, which is conventional and thus is not detailed herein.

To guarantee coverage, embodiments of the present disclosure provide multiple ways to determine the target beam based on the predefined beams. In some embodiments, the BS 110 may determine a set of candidate beams based on the predefined beams, so as to define a reduced scope for determining the target beam. The set of candidate beams is also referred to as a beam set, which includes one or more candidate beams. The candidate beam may be a beam used in historical data transmission, a beam adjacent to the beam used in historical data transmission, a beam indicated in a report from the second device, and/or other suitable beam determined based on the predefined beams. The BS 110 may determine which candidate beam(s) is to be used in data transmission to the terminal device 120, the ordering of sweeping the candidate beam(s) and so on. Details will be discussed with reference to embodiments shown in FIG. 4.

Alternatively, or in addition, in some embodiments, the BS 110 may use a wider beam to transmit data to the terminal device 120 and adopt a repetition number according to transmission quality to guarantee the coverage. The target beam may be determined from the plurality of predefined beams directly, without the need of determining the beam set. For example, the target beam may be determined as any of the predefined beams or a combination of a group of predefined beams. After determining the target beam, the BS 110 may determine a repetition number for the target beam. In some embodiments, the repetition number may be predefined as a fixed number, which may be set according to, for example, system requirements, high-level configurations, coverage edge radio quality in statistics, and so on. Alternatively, in some embodiments, the repetition number may be determined based on historical transmission quality, so that the BS 110 may transmit data over the target beam for the repetition number of times to the terminal device 120. Details will be discussed with reference to embodiments shown in FIG. 5.

Alternatively, or in addition, in some embodiments, the BS 110 may adjust the beam width of the target beam to avoid the beam mismatching. In some embodiments, the BS 110 may determine a beam width of the target beam based on historical transmission quality, and then determine the target beam having the determined beam width based on the plurality of predefined beams. Details will be discussed with reference to embodiments shown in FIG. 6.

It is to be understood that the target beam may be determined at any suitable time before transmitting data over it. For instance, when there is data to be transmitted to the terminal device 120, the BS 110 may determine the target beam as discussed in step 310. Alternatively, the BS 110 may determine the target beam in advance, regardless whether there is data to be transmitted to the terminal device 120.

It is to be understood that the above is described only for the purpose of illustration to help those skilled in the art to understand the present invention, without suggesting any limitations as to the scope of the invention. It would be appreciated that there may be multiple ways to determine the target beam based on the predefined beams.

Still in reference to method 300, in step 320, data is transmitted over the target beam to the second device in an active duration of the second device. The data transmitted by the BS 110 may include, but not limited to payload data. In some embodiments, the transmitted data may include control information and/or other suitable forms of data/messages/signals. Upon receipt of the data, the terminal device 120 may decode the data. Both the data transmission and reception are performed within the active duration of the terminal device 120.

In accordance with embodiments of the present invention, optionally, if the terminal device 120 fails to decode the data, for example, if expected feedback is not received from the terminal device 120 for a certain time period, the BS 110 may understand that the terminal device 120 is lost, and may initiatively initiate re-establishment of the radio connection between the BS 110 and the terminal device 120. In other words, if the BS 110 knows that the terminal device 120 is lost, it will trigger connection re-establishment. It is to be noted that such connection re-establishment is not triggered by entity within the core network, but the BS 110 itself. In an embodiment, the BS 110 may broadcast a message for initiating the connection re-establishment. The message may be broadcasted via media access control (MAC) layer, for example. Additionally, in some embodiments, the BS 110 may further coordinate with neighboring BSs and request the neighboring BSs to broadcast the message when necessary.

Figure 4:
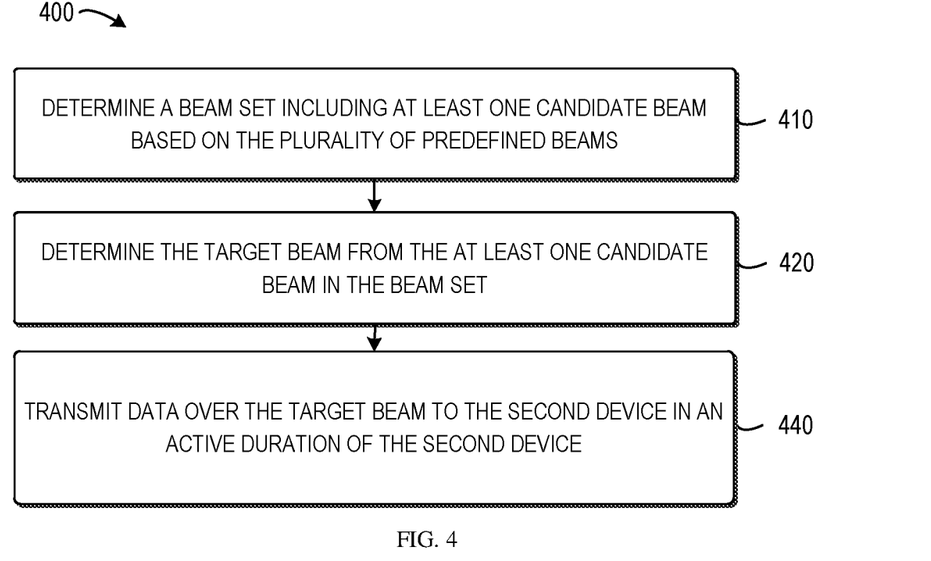
FIG. 4 shows a flowchart of a method implemented by a first device in accordance with another embodiment of the present disclosure.

Now some example embodiments of determination of the target beam will be described with respect to FIGS. 4-6. FIG. 4 shows a flowchart of a method 400 implemented by a first device in accordance with an embodiment of the present disclosure. The method 400 may be considered as a specific implementation of the method 300 described above with reference to FIG. 3, in which the target beam is determined based on a beam set. However, it is noted that this is only for the purpose of illustrating the principles of the present disclosure, rather than limiting the scope thereof.

The method 400 is entered in step 410, where a beam set including at least one candidate beam is determined based on the plurality of predefined beams. The beam set may include one or more candidate beams and may be determined in several ways. In some embodiments, the BS 110 may determine a size of the beam set, which indicates the number of candidate beams to be included in the beam set. The size may be determined based on beam width of each of the predefined beams, a moving speed of the second device, and/or other suitable factors. Then the BS 110 may select the number of beams from the plurality of predefined beams as candidate beams in the beam set.

In some embodiments, the beam set may include a beam used in historical data transmission, a beam adjacent to the beam used in historical data transmission, a beam indicated in a report from the second device, and/or other suitable beam determined based on the predefined beams.

The beam set may be static or dynamically. In some embodiments, the beam set may be changed according to channel conditions and/or other relevant factors. Alternatively or additionally, the beam set may be changed with time. In an embodiment, the BS 110 may determine a life period of each candidate beam in the beam set. The life period indicates a time period for which a candidate beam is in the beam set, that is, how long the candidate beam has been in the beam set. If the life period exceeds a predetermined life threshold, the BS 110 may remove the candidate beam from the beam set. Additionally or alternatively, the BS 110 may further determine one or more new candidate beams according to the size of the beam set.

In step 420, the target beam is determined from the at least one candidate beam in the beam set. There may be several ways to determine the target beam based on the beam set. In an embodiment, all the candidate beams in the beam set may be directly considered as target beams.

In an alternative embodiment, a subset including one or more candidate beams may be selected from the beam set according to some predefined rules, and the target beam may be determined from the subset of the beam set. For example, candidate beams in the beam set may be sorted according to their historical transmission qualities, and candidate beam(s) whose historical transmission qualities exceeding a predefined threshold may be selected into the subset. Then, candidate beam(s) in the subset may be determined as target beam(s).

In an alternative embodiment, the BS 110 may select the target beam based on beam directions (also briefly referred to as "directions" hereafter) of the candidate beams in the beam set. For instance, the BS 110 may determine, from the beam set, a central beam whose direction is closest to an average direction of all candidate beams in the beam set. Then, the BS 110 may determine the central beam as the target beam directly. As an alternative, the BS 110 may set a direction range based on the average direction and a predetermined threshold, and determine one or more candidate beams whose directions are within the direction range as target beams.

In step 440, data is transmitted over the target beam to the second device in an active duration of the second device. For example, the BS 110 may transmit the data over the target beam(s) determined in step 420 to the terminal device 120. If there are multiple target beams determined in step 420, the BS 110 may determine an order for sweeping the target beams. In an embodiment, the sweeping order may be determined by predicting and sorting beamforming gains of these target beams. Other aspects of this step are similar to those discussed with respect to step 320, and thus are not detailed herein.

In some embodiments, the active duration of the terminal device 120 may be determined based on the size of the beam set, such that the terminal device 120 does not miss any transmitted data. For instance, the active duration may be set as being equal to or larger than the total time for sweeping the target beams.

Figure 5:
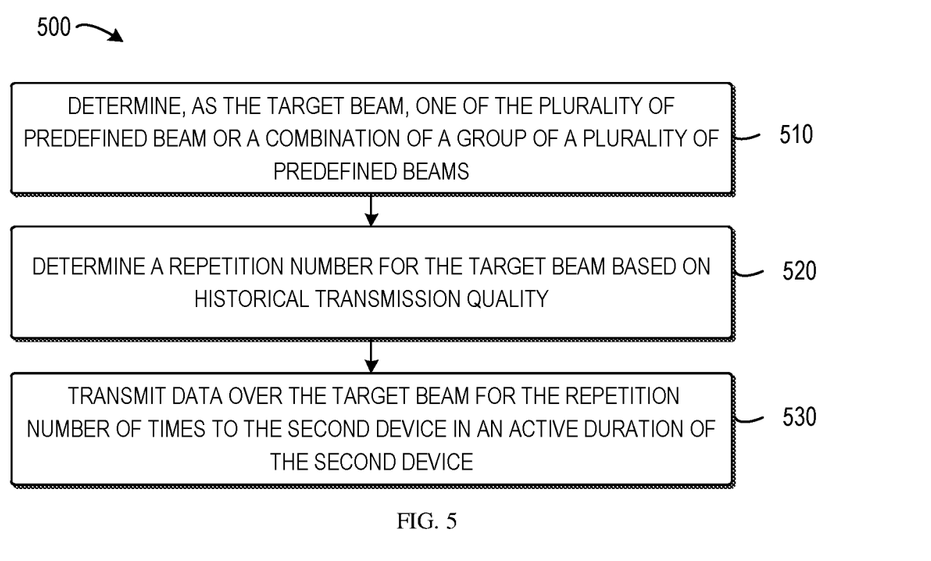
FIG. 5 shows a flowchart of a method implemented by a first device in accordance with still another embodiment of the present disclosure.

Reference is now made to FIG. 5, which illustrates a flowchart of a method 500 implemented by a first device in accordance with an embodiment of the present disclosure. The method 500 may be considered as a specific implementation of the method 300 described above with reference to FIG. 3, in which link gain can be compensated by proactive data retransmissions. However, it is noted that this is only for the purpose of illustrating the principles of the present disclosure, rather than limiting the scope thereof.

The method 500 is entered in step 510, where the first device determines one of the predefined beams as a target beam, or determines a combination of a group of the predefined beams as a target beam. In some embodiments, the target beam may be determined as a predefined beam that was used in the last data transmission to the terminal device 120 (also referred to as "the last beam"), a predefined beam whose direction is not far from the direction of the last beam, or the like.

In some alternative embodiments, the BS 110 may combine a group of predefined beams as a target beam. The group may be selected from the plurality of predefined beams according to certain criteria. For instance, a predefined beam that is associated with good transmission quality may be selected into the group. Transmission quality may be reflected by factors such as signal strength, signal to noise ratio (SNR), signal to interference and noise ratio (SINR), and the like. By comparing such factors with a predetermined threshold, the beam that is associated with good transmission quality may be selected. In another example, a predefined beam that has wider beam width may be also selected into the group. After the group is determined, all the beams in the group may be combined as one target beam.

There may be several ways to combine several beams into a new beam. For instance, directions of the beams may be merged into a single one. As such, the combined beam may produce a larger coverage. It is to be understood that the above example is only described for illustration of combination, instead of limitation. Those skilled would appreciate that the beams may be combined by merging other characteristics of the beams, such as beam width.

In step 520, the first device determines a repetition number for the target beam based on historical transmission quality. The repetition number represents a number of times for transmitting the data over the target beam to the terminal device 120. The historical transmission quality indicates the quality of historical data transmissions, such as signal strength, SNR, and SINR of pilot signals or other previously transmitted data. In some embodiments, the BS 110 may obtain the historical transmission quality based on a report from the terminal device 120. The report may be implemented as a measurement report, a channel report, or other suitable messages that are capable of reporting transmission quality.

Alternatively, or in addition, the historical transmission quality may be recorded by the BS 110 every time it is reported by the terminal device 120. When the BS 110 needs the historical transmission quality, it may obtain the historical transmission quality by searching relevant records, instead of waiting for any report from the terminal device 120.

In embodiments of the present disclosure, the repetition number may be obtained in several ways. In some embodiments, the BS 110 may obtain the historical transmission quality, for example, based on a report from the terminal device 120, and obtain reference transmission quality corresponding to a reference beam width. The reference beam width is the width of a reference beam and may be predefined according to system requirements, empirical values, statistics, and so on. The reference transmission quality may be the minimum acceptable quality corresponding to the reference beam width without repetition. Then, the BS 110 may determine the repetition number based on the historical transmission quality and the reference transmission quality.

In some embodiments, the repetition number may be determined according to the following:

$$N=\max(\lceil db2\ \text{lin}(g_{refl}-g_{report}+\Delta)\rceil,1) \quad (1)$$

where N represents the repetition number; $g_{report}$ represents historical transmission quality in dB; $g_{refl}$ represents the reference transmission quality; $\Delta$ represents a margin factor; and db2lin represents an operation for converting a value in dB to a value in a linear domain.

Alternatively, or in addition, the historical transmission quality may include statistical coverage edge radio quality. In this case, the repetition number may not need to be calculated according to equation (1), but may be set as a fixed number. The fixed repetition number may be determined based on the statistical coverage edge radio quality. In this case, it is unnecessary to configure the terminal device 120 to report any measurement.

In step 530, the first device transmits data over the target beam for the repetition number of times to the second device. For example, the BS 110 may transmit the data over the target beam for the repetition number of times to the terminal device 120. In some embodiments, the terminal device 120 may tentatively decode the data after receiving each repetition. If the data is decoded successfully before the last repetition, the terminal device 120 may not decode the left repetitions any longer. As an alternative, in some embodiments, the terminal device 120 may receive data for the repetition number of times, combine all the received data and decode the combination of the data.

Figure 6:
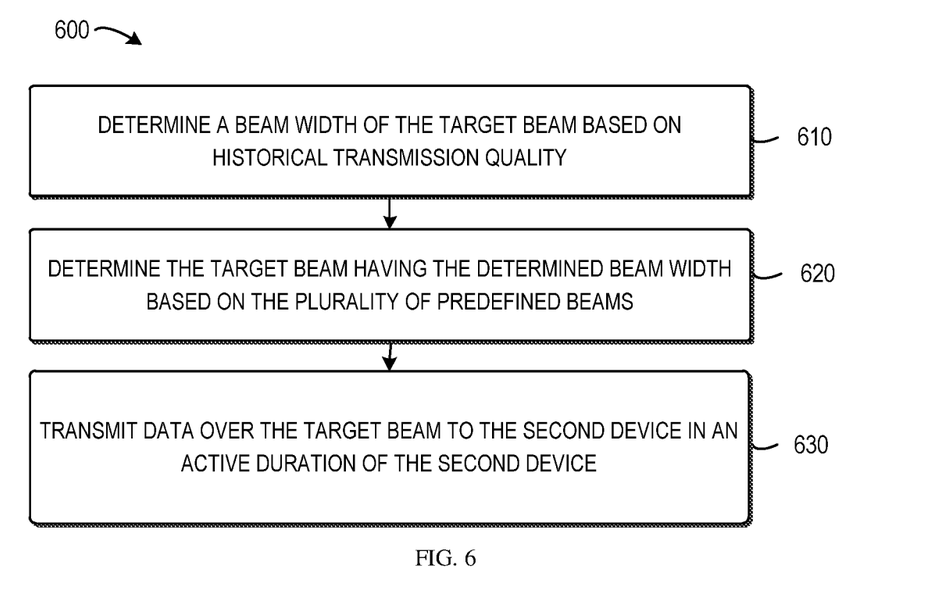
FIG. 6 shows a flowchart of a method implemented by a first device in accordance with yet still another embodiment of the present disclosure.

Reference is now made to FIG. 6, which illustrates a flowchart of a method 600 implemented by a first device in accordance with an embodiment of the present disclosure. The method 600 may be considered as a specific implementation of the method 300 described above with reference to FIG. 3, in which the beam width of the target beam is adjustable. However, it is noted that this is only for the purpose of illustrating the principles of the present disclosure, rather than limiting the scope thereof.

The method 600 is entered in step 610, where the first device determines a beam width of the target beam based on historical transmission quality. The beam width may be determined in several ways. In some embodiments, the BS 110 may obtain the historical transmission quality based on a report from the terminal device 120. Then the BS 110 may obtain reference transmission quality indicating transmission quality corresponding to an acceptable beam width. Based on the historical transmission quality and the reference transmission quality, the BS 110 may determine the beam width. In an example, the beam width may be determined based on:

$$K=\min(1/\lceil db2\ \text{lin}(g_{ref2}-g_{report}30\Delta)\rceil,1) \quad (2)$$

where K represents a coefficient for the beam width of the target beam; $g_{report}$ represents historical transmission quality in dB; $g_{ref2}$ represents the reference transmission quality; $\Delta$ represents a margin factor; and db2lin represents an operation for converting a value in dB to a value in a linear domain. In an example, the new beam width may be extended by K grids of beams.

Alternatively, in some embodiments, a mapping table of transmission quality to beam width may be stored at the BS 110. In such embodiments, the BS 110 may determine the beam width of the target beam by looking up the table.

In step 620, the first device determines the target beam having the determined beam width based on the plurality of predefined beams. In some embodiments, the BS 110 may select one beam that has the beam width determined in step 610 from the plurality of predefined beams, and determine the selected beam as the target beam. In some embodiments, the BS 110 may select a beam from the plurality of predefined beams, wherein a difference between the beam width of the select beam and the beam width determined in step 610 is less than a predetermined threshold.

In step 630, the first device transmits data over the target beam to the second device. For example, the BS 110 may transmit the data over the target beam determined in step 620 to the terminal device 120. Other aspects of this step are similar to those discussed with respect to step 320, and thus are not detailed herein.

According to embodiments of the present disclosure, the target beam determined in the method 500 or 600 may also be determined based on a beam set, such as the beam set determined in step 410. For the purpose of simplicity, the detailed description will be omitted.

Figure 7:
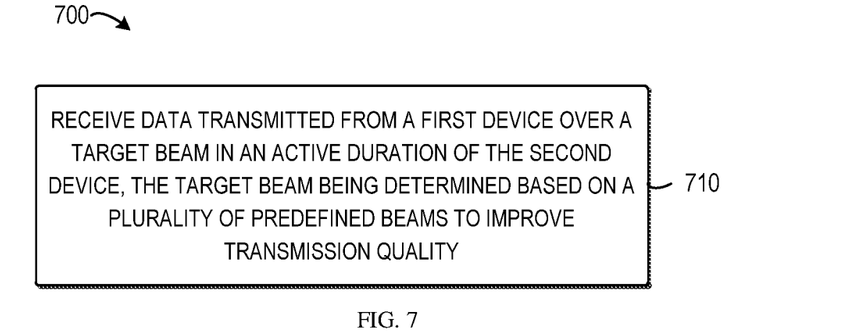
FIG. 7 shows a flowchart of a method implemented by a second device in accordance with one embodiment of the present disclosure.

Reference is now made to FIG. 7, which shows a flowchart of a method 700 in accordance with one embodiment of the present disclosure. It would be appreciated that the method 700 may be implemented by a second device, such as the terminal device 120 or other suitable devices. For the purpose of illustration, the method 700 will be described below with reference to the terminal device 120 in the wireless communication system 100.

In step 710, the terminal device 120 may receive data transmitted from a first device, for example, the BS 110, over a target beam in an active duration of the second device. The target beam may be determined based on a plurality of predefined beams according to embodiments described with respect to FIGS. 3-6.

Figure 8:
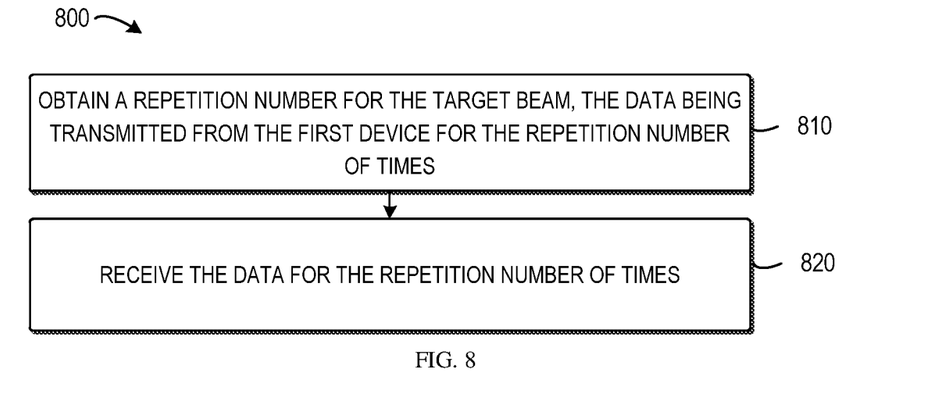
FIG. 8 shows a flowchart of a method implemented by a second device in accordance with another embodiment of the present disclosure.

In some embodiments, the BS 110 may transmit the data over the target beam for the repetition number of times to the terminal device 120. FIG. 8 shows a flowchart of a method 800 implemented by the terminal device 120 in this case. In step 810, the terminal device 120 may obtain the repetition number. Then, the terminal device 120 may receive the data for the repetition number of times in step 820. The repetition number may be determined by the BS 110, for example according to embodiments described with respect to step 510 of the method 500, and the BS 110 may inform the terminal device 120 the repetition number via a separate message or together with the transmitted data. Thus, the terminal device 200 may obtain the repetition number from the BS 110. As an alternative, the repetition number may obtain via high level signaling. It is to be noted that the above examples are only discussed for illustration, rather than limitation, those skilled in the art will appreciate other suitable ways to obtain the repetition number.

During receipt of the data, the terminal device 120 may tentatively decode the data received in each repetition. If the data is decoded successfully before the last repetition, the terminal device 120 may not decode the left repetitions any longer. As an alternative, in some embodiments, the terminal device 120 may receive data for the repetition number of times, combine all the received data and decode the combination of the data.

Figure 9:
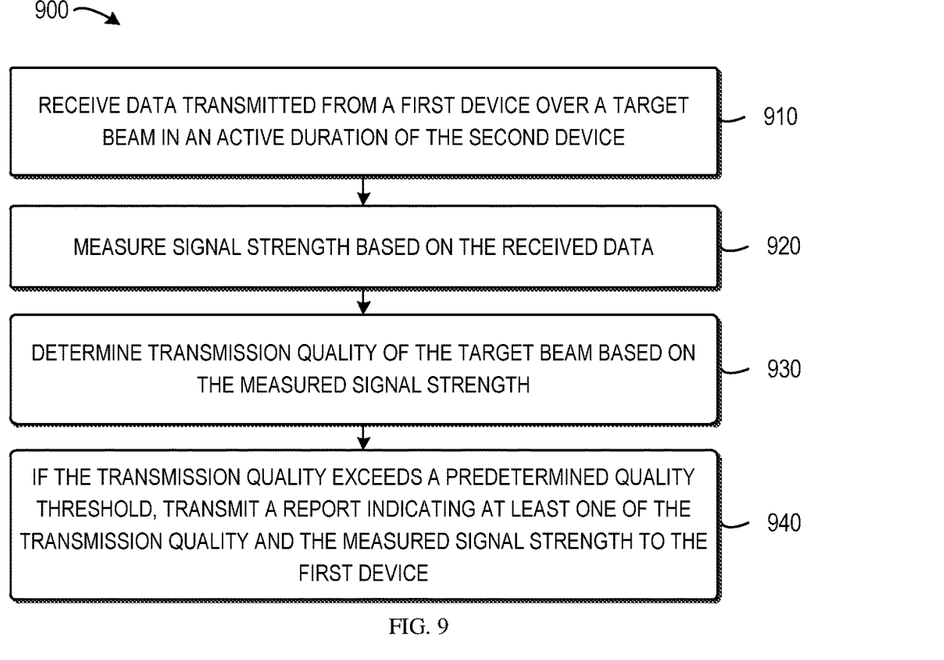
FIG. 9 shows a flowchart of a method implemented by a second device in accordance with still another embodiment of the present disclosure.

Optionally, in some embodiments, the terminal device 120 may further provide information about transmission quality to the BS 110. FIG. 9 shows a flowchart of a method 900 implemented by the terminal device 120 in this case. In step 910, the terminal device 120 may receive data transmitted from the BS 110 over the target beam. This step is similar to step 710 and is thus not repeated here. In step 920, the terminal device 120 may measure signal strength based on the received data. Based on the measured signal strength, terminal device 120 may determine the transmission quality of the target beam in step 930. In step 940, if the transmission quality exceeds a predetermined quality threshold, the terminal device 120 may transmit to the BS 110 a report (for example, a measurement report, a channel report, and the like) that indicates the transmission quality, the measured signal strength, and so on.

Figure 10:
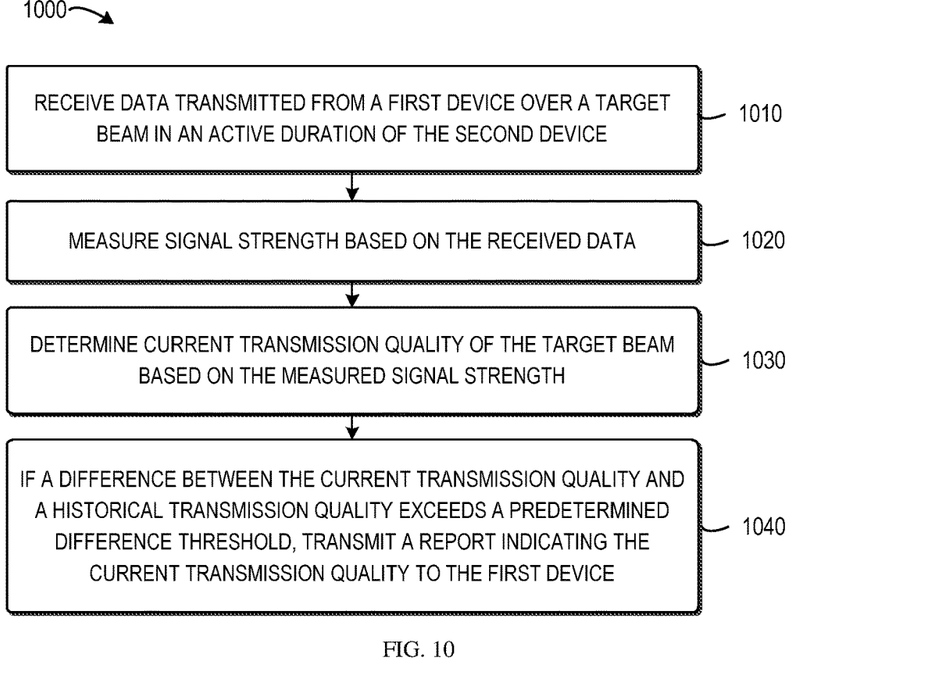
FIG. 10 shows a flowchart of a method implemented by a second device in accordance with yet still another embodiment of the present disclosure.

Optionally, in some embodiments, the terminal device 120 may further provide information about current transmission quality to the BS 110 based on comparison of the current transmission quality and historical transmission qualities. FIG. 10 shows a flowchart of a method 1000 implemented by the terminal device 120 in this case. In step 1010, the terminal device 120 may receive data transmitted from the BS 110 over the target beam. This step is similar to step 710 and is thus not repeated here. In step 1020, the terminal device 120 may measure signal strength based on the received data. In step 1030, the terminal device 120 may determine a current transmission quality of the target beam based on the measured signal strength. In step 1040, if a difference between the current transmission quality and historical transmission qualities exceeds a predetermined difference threshold, the terminal device 120 may transmit a report indicating the current transmission quality to the BS 110.

Optionally, in some embodiments, in response to receiving a broadcasting message for initiating connection re-establishment from the BS 110, the terminal device 120 may perform re-establishment of a radio connection between the first device and the second device.

Figure 11:
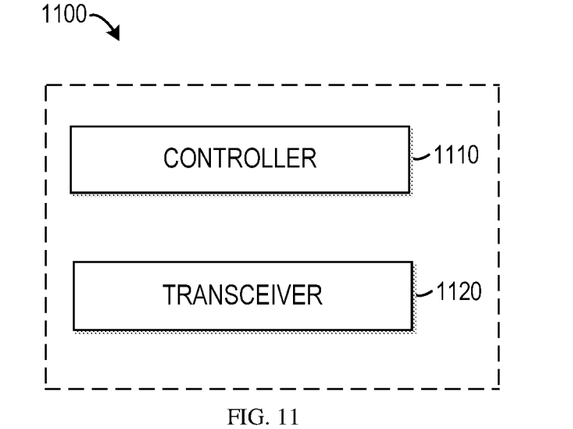
FIG. 11 shows a block diagram of a first device in accordance with one embodiment of the present disclosure.

FIG. 11 shows a block diagram of a first device 1100 in accordance with one embodiment of the present disclosure. It would be appreciated that the first device 1100 may be implemented by the BS 110 as shown in FIG. 1 or other suitable devices.

As shown, the first device 1100 comprises a controller 1110 and a transceiver 1120. The controller 1100 is configured to determine a target beam based on a plurality of predefined beams for data transmission to a second device performing discontinuous reception. The transceiver 1120 is configured to transmit data over the target beam to the second device in an active duration of the second device to improve transmission quality.

In an embodiment, the controller 1110 may be further configured to: determine a beam set including at least one candidate beam based on the plurality of predefined beams, the at least one candidate beam including at least one of a beam used in historical data transmission, a beam adjacent to the beam used in historical data transmission, and a beam indicated in a report from the second device; and determine the target beam from the at least one candidate beam in the beam set.

In an embodiment, the controller 1110 may be further configured to: determine a size of the beam set based on at least one of beam width of each of the plurality of predefined beams and a moving speed of the second device; and select the at least one candidate beam from the plurality of predefined beams according to the determined size of the beam set.

In an embodiment, the controller 1110 may be further configured to: determine a life period of each candidate beam in the beam set, the life period indicating a time period for which a candidate beam is in the beam set; and in response to determining that the life period of a candidate beam exceeds a predetermined life threshold, remove the candidate beam from the beam set.

In an embodiment, the controller 1110 may be further configured to: calculate an average direction of the at least one candidate beam in the beam set; determine one of the at least one candidate beam having a direction closest to the average direction as a central beam; and determine the target beam based on the central beam.

In an embodiment, the controller 1110 may be further configured to: determine, as the target beam, one of the plurality of predefined beams or a combination of a group of the plurality of predefined beams.

In an embodiment, the controller 1110 may be further configured to determine a repetition number for the target beam based on historical transmission quality. The transceiver 1120 may be further configured to transmit data over the target beam for the repetition number of times to the second device.

In an embodiment, the controller 1110 may be further configured to: obtain the historical transmission quality based on a report from the second device; obtain reference transmission quality corresponding to a reference beam width; and determine the repetition number based on the historical transmission quality and the reference transmission quality.

In an embodiment, the controller 1110 may be further configured to: determine a beam width of the target beam based on historical transmission quality; and determine the target beam having the determined beam width based on the plurality of predefined beams.

In an embodiment, the controller 1110 may be further configured to: obtain the historical transmission quality based on a report from the second device; obtain reference transmission quality indicating transmission quality corresponding to an acceptable beam width; and determine the beam width based on the historical transmission quality and the reference transmission quality.

In an embodiment, the transceiver 1120 may be further configured to, if the second device fails to decode the data, transmit a broadcasting message for initiating connection re-establishment to initiate re-establishment of a radio connection between the first device and the second device.

Figure 12:
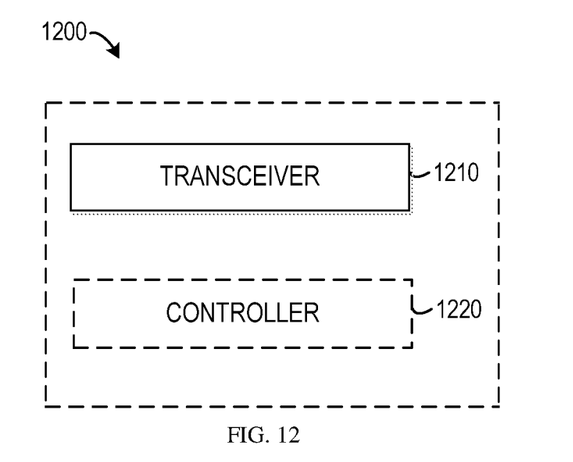
FIG. 12 shows a block diagram of a second device in accordance with one embodiment of the present disclosure.

FIG. 12 shows a block diagram of a second device 1200 in accordance with one embodiment of the present disclosure. It would be appreciated that the second device 1200 may be implemented by the terminal device 120 as shown in FIG. 1 or other suitable devices.

As shown, the second device 1200 comprises a transceiver 1210 configured to receive data transmitted from a first device over a target beam in an active duration of the second device, the target beam being determined based on a plurality of predefined beams to improve transmission quality.

In an embodiment, the target beam may be determined from a beam set including at least one candidate beam, the at least one candidate beam including at least one of a beam used in historical data transmission, a beam adjacent to the beam used in historical data transmission, and a beam indicated in a report from the second device.

In an embodiment, the target beam may be determined by determining a size of the beam set based on at least one of beam width of each of the plurality of predefined beams and a moving speed of the second device, and selecting the at least one candidate beam from the plurality of predefined beams according to the determined size of the beam set.

In an embodiment, the target beam may be determined by determining a life period of each candidate beam in the beam set, the life period indicating a time period for which a candidate beam is in the beam set, and in response to determining that the life period of a candidate beam exceeds a predetermined life threshold, removing the candidate beam from the beam set.

In an embodiment, the target beam may be determined by calculating an average direction of the at least one candidate beam in the beam set, determining one of the at least one candidate beam having a direction closest to the average direction as a central beam, and determining the target beam based on the central beam.

In an embodiment, the second device may further comprise a controller 1220 configured to obtain a repetition number for the target beam, the data being transmitted from the first device for the repetition number of times. The transceiver 1210 may be further configured to receive the data for the repetition number of times.

In an embodiment, the second device may further comprise a controller 1220 configured to measure signal strength based on the received data, determine transmission quality of the target beam based on the measured signal strength, and determine whether the transmission quality exceeds a predetermined quality threshold. The transceiver 1210 may be further configured to, if the transmission quality exceeds the predetermined quality threshold, transmit to the first device a report indicating at least one of the target beam and the measured signal strength.

In an embodiment, the second device may further comprise a controller 1220 configured to measure signal strength based on the received data, determine current transmission quality of the target beam based on the measured signal strength, and determine whether a difference between the current transmission quality and a historical transmission quality exceeds a predetermined difference threshold. The transceiver 1210 may be further configured to, if the difference exceeds the predetermined difference threshold, transmit to the first device a report indicating the current transmission quality.

In an embodiment, the second device may further comprise a controller 1220 configured to, in response to receiving a broadcasting message for initiating connection re-establishment from the first device, perform re-establishment of a radio connection between the first device and the second device.

It should be appreciated that components included in the first device 1100 correspond to the steps of the methods 300-600, and components included in the second device 1200 correspond to the steps of the methods 700-1000. Therefore, all operations and features described above with reference to FIGS. 3 to 6 are likewise applicable to the components included in the first device 1100 and have similar effects, and all operations and features described above with reference to FIGS. 7 to 10 are likewise applicable to the components included in the second device 1200 and have similar effects. For the purpose of simplification, the details will be omitted.

The components included in the first device 1100 and the second device 1200 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the first device 1100 and the second device 1200 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 13:
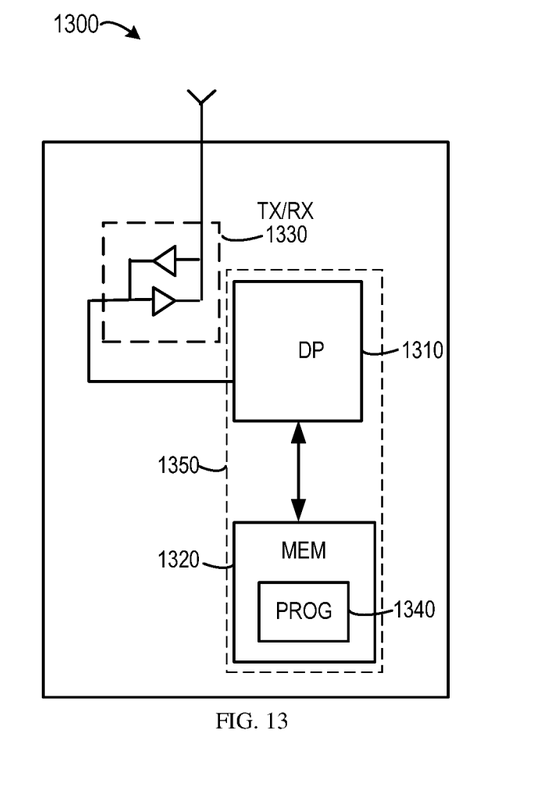
FIG. 13 shows a simplified block diagram of a device that is suitable for use in implementing embodiments of the present disclosure.

FIG. 13 shows a simplified block diagram of a device 1300 that is suitable for use in implementing embodiments of the present disclosure. It would be appreciated that the device 1300 may be implemented by the first device, such as, the BS 110, or the second device, such as the terminal device 120.

As shown, the device 1300 includes a data processor (DP) 1310, a memory (MEM) 1320 coupled to the DP 1310, a suitable RF transmitter TX and receiver RX 1340 coupled to the DP 1310, and a communication interface 1350 coupled to the DP 1310. The MEM 1320 stores a program (PROG) 1330. The TX/RX 1340 is for bidirectional wireless communications. Note that the TX/RX 1340 has at least one antenna to facilitate communication, though in practice an Access Node mentioned in this application may have several ones. The communication interface 1350 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The PROG 1330 is assumed to include program instructions that, when executed by the associated DP 1310, enable the device 1300 to operate in accordance with the embodiments of the present disclosure, as discussed herein with the methods 300 to 600 in FIGS. 3 to 6 or the methods 700 to 1000 in FIGS. 7 to 10. The embodiments herein may be implemented by computer software executable by the DP 1310 of the device 1300, or by hardware, or by a combination of software and hardware. A combination of the data processor 1310 and MEM 1320 may form processing means 1360 adapted to implement various embodiments of the present disclosure.

The MEM 1320 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1300, there may be several physically distinct memory modules in the device 1300. The DP 1310 may be of any type suitable to the local technical environment, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented by a first device in a wireless communication network, comprising:
   determining that a second device is performing discontinuous reception;
   determining a beam set from a plurality of predefined beams, wherein the beam set includes candidate beams for data transmission to the second device, wherein the beam set includes a beam used in historical data transmission, and wherein a size of the beam set is determined based on at least one of beam width of each of the plurality of predefined beams and a moving speed of the second device;
   determining a target beam from the beam set by selecting at least one candidate beam according to the size of the beam set; and
   transmitting data over the target beam to the second device in an active duration of the discontinuous reception.

2. The method according to claim 1, wherein the beam set includes a beam adjacent to the beam used in historical data transmission as a candidate beam.

3. The method according to claim 1, wherein the determining the target beam further comprises:
   determining, as the target beam, a combination of the candidate beams.

4. The method according to claim 1, further comprising:
   determining a repetition number for the target beam based on historical transmission quality, and
   transmitting data over the target beam for the repetition number of times to the second device.

5. The method according to claim 4, wherein the determining the repetition number comprises:
   obtaining the historical transmission quality based on a report from the second device;
   obtaining reference transmission quality corresponding to a reference beam width; and
   determining the repetition number based on the historical transmission quality and the reference transmission quality.

6. A method implemented by a second device performing discontinuous reception in a wireless communication network, comprising:
   receiving data transmitted from a first device over a target beam in an active duration of the discontinuous reception, the target beam being determined based on:
      a beam set determined from a plurality of predefined beams, wherein the beam set includes candidate beams for data transmission to the second device, wherein the beam set includes a beam used in historical data transmission, and wherein a size of the beam set is determined based on at least one of beam width of each of the plurality of predefined beams and a moving speed of the second device; and
      the target beam determined from the beam set by selecting at least one candidate beam according to the size of the beam set.

7. The method according to claim 6, wherein the beam set includes a beam adjacent to the beam used in historical data transmission as a candidate beam.

8. The method according to claim 6, wherein receiving the data comprises:
- obtaining a repetition number for the target beam, the data being transmitted from the first device for the repetition number of times; and
- receiving the data for the repetition number of times.

9. The method according to claim 6, further comprising: measuring signal strength based on the received data;
- determining transmission quality of the target beam based on the measured signal strength; and
- if the transmission quality exceeds a predetermined quality threshold, transmitting a report indicating at least one of the determined transmission quality and the measured signal strength to the first device.

10. The method according to claim 6, further comprising: measuring signal strength based on the received data;
- determining current transmission quality of the target beam based on the measured signal strength; and
- when a difference between the current transmission quality and a historical transmission quality exceeds a predetermined difference threshold, transmitting a report indicating the current transmission quality to the first device.

11. A first device in a wireless communication network, comprising:
- a controller configured to determine that a second device is performing discontinuous reception, determine a beam set from a plurality of predefined beams, wherein the beam set includes candidate beams for data transmission to the second device, wherein the beam set includes a beam used in historical data transmission, and wherein a size of the beam set is determined based on at least one of beam width of each of the plurality of predefined beams and a moving speed of the second device and the controller to determine a target beam from the beam set by selecting at least one candidate beam according to the size of the beam set; and
- a transceiver configured to transmit data over the target beam to the second device in an active duration of the discontinuous reception.

12. The first device according to claim 11, wherein the beam set includes a beam adjacent to the beam used in historical data transmission as a candidate beam.

13. A second device for performing discontinuous reception in a wireless communication network, comprising:
- a transceiver configured to receive data transmitted from a first device over a target beam in an active duration of the discontinuous reception, the target beam being determined based on:
  - a beam set determined from a plurality of predefined beams, wherein the beam set includes candidate beams for data transmission to the second device, wherein the beam set includes a beam used in historical data transmission, and wherein a size of the beam set is determined based on at least one of beam width of each of the plurality of predefined beams and a moving speed of the second device; and
  - the target beam determined from the beam set by selecting at least one candidate beam according to the size of the beam set.

14. The second device according to claim 13, wherein the beam set includes a beam adjacent to the beam used in historical data transmission as a candidate beam.

* * * * *